(12) United States Patent
Nagaoka

(10) Patent No.: US 7,957,242 B2
(45) Date of Patent: Jun. 7, 2011

(54) SERVO PARAMETER DETECTION METHOD AND OPTICAL PICKUP DEVICE USING THE SAME

(75) Inventor: Satoshi Nagaoka, Higashihiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 360 days.

(21) Appl. No.: 12/330,212

(22) Filed: Dec. 8, 2008

(65) Prior Publication Data
US 2009/0154307 A1 Jun. 18, 2009

(30) Foreign Application Priority Data

Dec. 17, 2007 (JP) ................................. 2007-324415

(51) Int. Cl.
*G11B 7/00* (2006.01)
(52) U.S. Cl. ................ 369/53.34; 369/44.23; 369/53.19
(58) Field of Classification Search ........................ None
See application file for complete search history.

(56) References Cited

U.S. PATENT DOCUMENTS

| | | | | |
|---|---|---|---|---|
| 6,243,326 B1 * | 6/2001 | Sumi et al. | ................. | 369/13.29 |
| 6,282,161 B1 * | 8/2001 | Son et al. | .................... | 369/53.19 |
| 6,359,845 B1 * | 3/2002 | Lee et al. | .................... | 369/44.23 |
| 6,680,887 B2 * | 1/2004 | Shihara et al. | ............. | 369/44.32 |
| 6,785,209 B2 * | 8/2004 | Chung et al. | ............... | 369/53.19 |
| 6,928,034 B2 * | 8/2005 | Ohtsu et al. | ................ | 369/44.29 |
| 7,065,014 B2 * | 6/2006 | Park | ........................... | 369/44.32 |
| 7,570,548 B2 | 8/2009 | Kurokawa et al. | | |
| 7,778,130 B2 * | 8/2010 | Nakagawa et al. | ........ | 369/53.28 |
| 2002/0031060 A1 * | 3/2002 | Mashimo et al. | .......... | 369/44.29 |
| 2003/0179665 A1 | 9/2003 | Iwazawa et al. | | |
| 2003/0198156 A1 * | 10/2003 | Kondo | ........................ | 369/275.3 |
| 2004/0037195 A1 * | 2/2004 | Sasaki et al. | ............... | 369/53.19 |
| 2004/0125709 A1 * | 7/2004 | Liang-Tang | ............... | 369/44.29 |
| 2005/0169155 A1 * | 8/2005 | Kim et al. | ................. | 369/112.23 |
| 2007/0064552 A1 | 3/2007 | Kurokawa et al. | | |
| 2007/0064558 A1 * | 3/2007 | Hoshi | ........................ | 369/47.26 |
| 2007/0211585 A1 * | 9/2007 | Wu | ........................... | 369/44.29 |

FOREIGN PATENT DOCUMENTS

| | | |
|---|---|---|
| JP | 2003-272203 | 9/2003 |
| JP | 2005-267800 | 9/2005 |
| JP | 2006-338809 | 12/2006 |
| JP | 2007-80423 | 3/2007 |
| JP | 2007-87483 A | 4/2007 |

\* cited by examiner

*Primary Examiner* — Peter Vincent Agustin
(74) *Attorney, Agent, or Firm* — Morrison & Foerster LLP

(57) ABSTRACT

An optical pickup inspection device 3 sends to an actuator drive circuit 16 a command for changing defocus offset amount to set defocus offset amounts, and calculates jitter values for each of the defocus offset amounts based on a reproduction signal from a reproduction signal generation circuit 14. Then, the device 3 determines a quadric approximating curve of jitter values relative to the defocus offset amounts and calculates a correlation coefficient $R^2$ of the quadric approximating curve and measured values. If the correlation coefficient $R^2$ is lower than a threshold value, the setting of defocus offset amounts and the calculation of jitter values are executed once again, otherwise, a defocus offset amount corresponding to a bottom value of jitter in the quadric approximating curve is determined as an optimum value of the defocus offset amount. Thus, a less-error, high-accuracy optimum value of the defocus offset amount can be obtained.

5 Claims, 4 Drawing Sheets

SERVO PARAMETER DETECTION METHOD AND OPTICAL PICKUP DEVICE USING THE SAME

CROSS-REFERENCE TO RELATED APPLICATIONS

This nonprovisional application claims priority under 35 U.S.C. §119(a) on Patent Application No(s). 2007-324415 filed in Japan on Dec. 17, 2007, the entire contents of which are hereby incorporated by reference.

BACKGROUND OF THE INVENTION

The present invention relates to a servo parameter detection method for manufacture of optical pickup devices to be mounted on information recording/reproduction apparatuses, as well as to an optical pickup device using the servo parameter detection method.

In order to detect an optimum value of a servo parameter required for recording and reproduction on optical discs such as BDs (Blu-ray Discs), DVDs (Digital Versatile Discs) and CDs (Compact Discs), there arises a need for optimum parameter detection using a reproduction signal or its jitter.

In recent years, there has been a demand for higher density of optical discs. For achievement of this higher density, advancements have been made toward enhancement of track recording density or narrower pitches of tracks in the information recording layer of optical discs. It is also needed for the achievement of higher density of optical discs to reduce the beam diameter of an optical beam converged on the information recording layer of an optical disc. Means for achieving the reduction of the beam diameter of the optical beam could be to increase the numerical aperture (NA) of the optical beam outputted from an objective lens as a converging optical system of an optical pickup device, and to shorten the wavelength of the optical beam.

When an optical beam from a light source passes through a cover glass of an optical disc, there arises a spherical aberration. Since the magnitude of the spherical aberration is, in general, proportional to the fourth power of a numerical aperture, use of an objective lens having a high numerical aperture would involve a matter of errors of the spherical aberration, which would have influences on information reading. Therefore, use of an objective lens having a high numerical aperture needs to be accompanied by high-accuracy correction of the spherical aberration.

It is also necessary that the focus servo meets high tracking performance so that the beam spot diameter keeps generally constant at all times. Generally, the focus servo needs to be controlled within a range enough smaller than the depth of focus that is proportional to the wavelength of a light source and inversely proportional to the square of the numerical aperture of the objective lens. Further, when the optical pickup inclines relative to the disc due to a distortion of the disc or a mounting error of the actuator of the optical pickup or the like, there arises a coma aberration in converging light on the recording surface of the disc. Since the amount of this coma aberration is proportional to the cube of the NA value, the result particularly with a high NA value, such as in BDs, would be that only a slight characteristic change of the disc may cause occurrence of quite a large coma aberration.

As the method for achieving adjustment of the focus offset amount and the spherical aberration with high accuracy, for example, there is a method, as exemplified by an information recording/reproduction method disclosed in JP 2007-87483 A, which includes learning a difference between a spherical aberration amount resulting upon a best jitter amount and a spherical aberration amount resulting upon a maximum tracking error signal amplitude, and determining an optimum value of the difference.

However, the conventional information recording/reproduction method disclosed in JP 2007-87483 A has the following problems.

That is, when a spherical aberration amount resulting upon a minimum jitter amount is determined by varying the spherical aberration amount in the process of detecting the minimum jitter amount (servo parameter), there may occur changes in the minimum value of the jitter amount because the jitter is not stabilized in an optical pickup whose servo operation is unstable. Moreover, due to configurational constraints involved in size or thickness reduction of the optical pickup, there may arise cases where it becomes difficult to sufficiently vary the servo parameter such as a spherical aberration correction amount to draw an approximating curve.

SUMMARY OF THE INVENTION

Accordingly, an object of the present invention is to provide a servo parameter detection method, as well as an optical pickup device using the detection method, which is capable of high-accuracy servo parameter detection even if the optical pickup is unstable in servo operation or if the optical pickup is reduced in size and thickness.

In order to achieve the above object, there is provided a servo parameter detection method comprising the steps of:

outputting a command for changing a servo parameter from an optical pickup inspection device to an optical pickup device which performs recording and reproduction on an optical recording/reproduction medium by using laser light so that the servo parameter of the optical pickup device is changed successively;

generating reproduction signals successively by a reproduction signal generation circuit of the optical pickup device, based on reflected light resulting when the laser light emitted from the optical pickup device by successively changing the servo parameter is reflected by a reference disc serving as a reference for adjustment of the servo parameter;

based on the reproduction signal generated by the reproduction signal generation circuit for each of the servo parameters, determining jitter representing quality of the reproduction signal by the optical pickup inspection device;

by the optical pickup inspection device, approximating a relationship between the servo parameters and the jitter values, respectively, with an approximating curve;

by the optical pickup inspection device, calculating a correlation coefficient between approximate values in the approximating curve of the servo parameters and the jitter values and measured values; and by the optical pickup inspection device, on condition that the calculated correlation coefficient is equal to or lower than a specified value, outputting once again to the optical pickup device a command for changing the servo parameter and calculating a correlation coefficient between the approximate values and the measured values of the servo parameters and the jitter values, and on the other hand, on condition that the calculated correlation coefficient is over the specified value, detecting a servo parameter value corresponding to a best value of the jitter values as a servo parameter of the optical pickup device.

According to the servo parameter detection method, in manufacture or other process of the optical pickup device, during detection of a servo parameter of the optical pickup device, jitter values are determined based on resulting reproduction signals for every servo parameter values with the servo parameter successively changed. Then, a relationship between the servo parameters and the jitter values is plotted by an approximating curve, and a correlation coefficient between measured values and approximate values in the approximating curve of the servo parameters and the jitter values is calculated. Therefore, discontinuity of the jitter due to instability of the servo operation can be detected by the correlation coefficient.

Further, if the correlation coefficient is equal to or lower than a specified value, a correlation coefficient between measured values and approximate values of the servo parameters and the jitter values is calculated once again. On the other hand, if the correlation coefficient is over the specified value, a servo parameter value corresponding to a best value of the jitter is detected as a servo parameter of the optical pickup device. Therefore, it becomes implementable to detect a less-error, high-accuracy servo parameter.

In one embodiment of the invention, the servo parameter of the optical pickup device is a spherical aberration correction amount.

According to the embodiment, it becomes implementable to detect a less-error, high-accuracy spherical aberration correction amount.

In one embodiment of the invention, the servo parameter of the optical pickup device is an inclination angle of a pickup.

According to the embodiment, it becomes implementable to detect a less-error, high-accuracy inclination angle of the pickup.

In one embodiment of the invention, the servo parameter of the optical pickup device is a defocus offset amount.

According to the embodiment, it becomes implementable to detect a less-error, high-accuracy defocus offset amount.

In one embodiment of the invention, in a step of successively shifting a collimator lens in an optical-axis direction by the optical pickup device in response to a command derived from the optical pickup inspection device to thereby successively change the spherical aberration correction, if enough range of jitter values to obtain the jitter best value cannot be obtained due to a limited operating range of the collimator lens in the optical-axis direction, the jitter best value is obtained by using the approximating curve.

According to the embodiment, even if the operating range of the collimator lens in the optical-axis direction is limited due to configurational constraints of the pickup or the like so that a best value of the jitter cannot be obtained from the measured values of the jitter, a best value of the jitter can be obtained by using the approximating curve, making it implementable to detect a less-error, high-accuracy spherical aberration correction amount.

In one embodiment of the invention, an optical pickup device for performing recording and reproduction on an optical recording/reproduction medium by using laser light, the optical pickup device including:

a servo parameter recording section for recording the servo parameter detected by the above parameter detection method.

According to the optical pickup device of the embodiment, a less-error, high-accuracy servo parameter is recorded in the servo parameter recording section of the optical pickup device. Therefore, in mounting of the optical pickup device onto an optical information recording/reproduction apparatus, a servo parameter recorded in the servo parameter recording section is read and stored in a storage unit or the like of the optical information recording/reproduction apparatus. Then, with the servo parameter used as control data for operation of the optical pickup device, it becomes implementable to control the correction of spherical aberration or the setting of the inclination angle of the pickup or the setting of the defocus offset amount, with high accuracy.

In one embodiment of the invention, the servo parameter recording section is a QR code recording section in which a QR code representing the servo parameter is recorded.

According to the embodiment, the servo parameter detected by the servo parameter detection method is recorded in QR code that has tens to hundreds times higher information amounts than bar code, that involves only an about one tenth of the space required by the bar code for an equal information amount, that is resistant to contamination and damage, and that is readable in every direction. Therefore, even in the case where the optical pickup device is shipped in a single unit and assembled to an optical information recording apparatus, the servo parameter can be read easily and correctly and registered and used in the optical information recording apparatus.

In one embodiment of the invention, the servo parameter recording section is a semiconductor memory.

According to the embodiment, the servo parameter detected by the above-described servo parameter detection method is recorded on the semiconductor memory. Therefore, rewrite of the recorded servo parameter is easily achievable.

As apparent from the above description, the servo parameter detection method of the invention includes the steps of, based on reproduction signals for individual servo parameters resulting from successively changing a servo parameter of the optical pickup device, determining jitter values representing quality of the individual reproduction signals, respectively, plotting a relationship between the servo parameters and the jitter values by an approximating curve, and calculating a correlation coefficient between measured values and approximate values in the approximating curve of the servo parameters and the jitter values. Thus, with the correlation coefficient, it becomes implementable to detect any discontinuity of the jitter due to instability of the servo operation.

Further, if the correlation coefficient is equal to or lower than a specified value, then a correlation coefficient between measured values and approximate values of the servo parameters and the jitter values is calculated once again. On the other hand, if the correlation coefficient is over the specified value, then a servo parameter value corresponding to a best value of the jitter is detected as a servo parameter of the optical pickup device. Therefore, a less-error, high-accuracy servo parameter can be detected.

Also, in the optical pickup device of the invention, a less-error, high-accuracy servo parameter detected by the above-described servo parameter detection method is recorded in the servo parameter recording section. Therefore, in mounting of the optical pickup device onto an optical information recording/reproduction apparatus, a servo parameter recorded in the servo parameter recording section is read and stored in a storage unit or the like of the optical information recording/reproduction apparatus. Then, with the servo parameter used as control data for operation of the optical pickup device, it becomes implementable to control the correction of spherical aberration or the setting of the inclination angle of the pickup or the setting of the defocus offset amount, with high accuracy.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Figure 1:
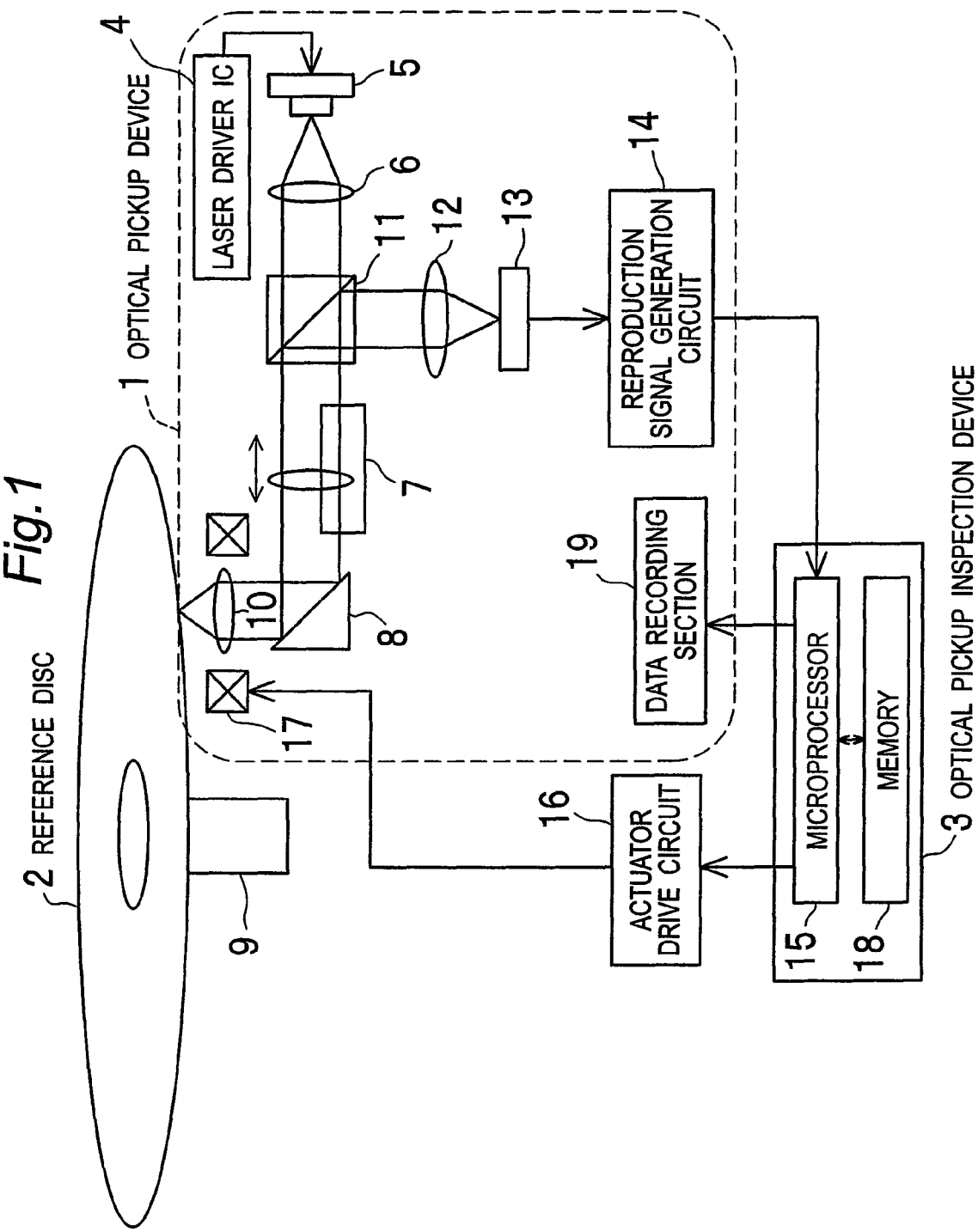
FIG. 1 is a view showing an optical pickup device, a reference disc and an optical pickup inspection device for implementing the servo parameter detection method according to the present invention.

Hereinbelow, the present invention will be described in detail by way of embodiment thereof illustrated in the accompanying drawings. FIG. 1 shows an optical pickup device, a reference disc and an optical pickup inspection device for implementing the servo parameter detection method according to this embodiment. In FIG. 1, reference numeral 1 denotes an optical pickup device, 2 denotes a reference disc serving as a reference for performing adjustment of the servo parameter, and 3 denotes an optical pickup inspection device.

In the optical pickup device 1, laser light emitted from a laser diode 5 based on a drive signal derived from a laser driver IC (Integrated Circuit) 4 is collimated by a collimator lens 6 into a parallel beam. The beam is given a specified spherical aberration by a spherical aberration correction mechanism 7, and reflected by a raise mirror 8 so as to be changed in the direction of its traveling course toward the reference disc 2 that is being rotationally driven by a spindle motor 9. Thereafter, the laser light is converged by an objective lens 10 so that a light spot is formed on an information recording surface of the reference disc 2.

The laser light reflected by the information recording surface of the reference disc 2, after passing through the objective lens 10, is reflected by the raise mirror 8 toward a beam splitter 11, reflected by the beam splitter 11 toward a photodetector 13, and converged onto the photodetector 13 by a detector lens 12 or the like. Then, based on a signal from the photodetector 13, a reproduction signal is generated by a reproduction signal generation circuit 14 and outputted to the optical pickup inspection device 3.

The optical pickup inspection device 3 sends, by a microprocessor 15, a command to an actuator drive circuit 16 to drive an actuator 17, by which a defocus offset amount is changed successively. Then, while the defocus offset amount is being successively changed, jitter representing the quality of the reproduction signal is calculated based on the reproduction signal inputted from the reproduction signal generation circuit 14 of the optical pickup device 1, and stored into a memory 18 in association with the defocus offset amount. Then, based on the defocus offset amounts and jitter amounts stored in the memory 18, a high-accuracy detection of the servo parameter (an optimum value of the defocus offset amount) is carried out in the following manner.

Figure 2:
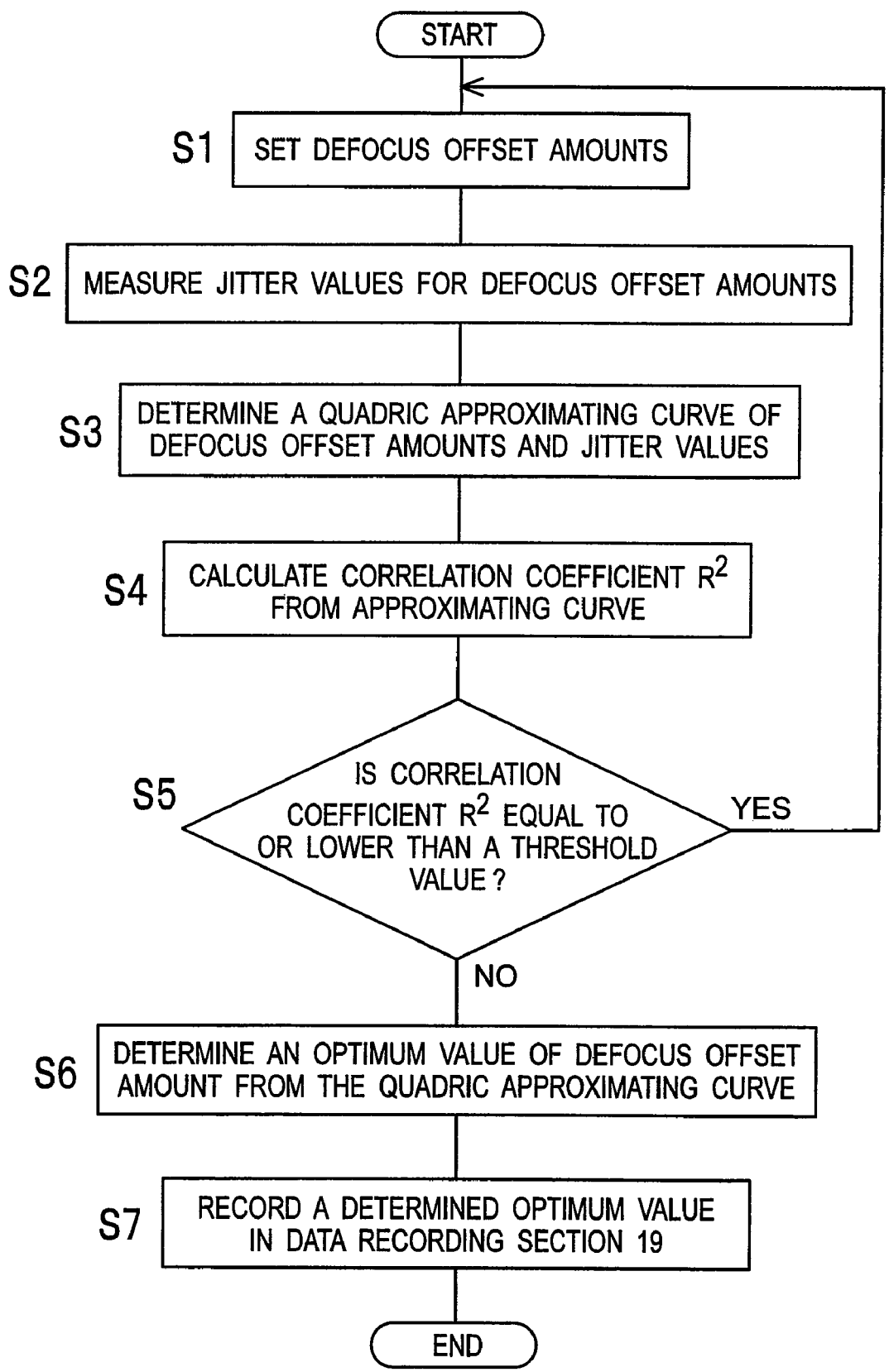
FIG. 2 is a flowchart of defocus-offset-amount optimum value calculation process to be executed by the microprocessor of the optical pickup inspection device in FIG. 1.

FIG. 2 shows a flowchart of defocus-offset-amount optimum value calculation process to be executed by the microprocessor 15 of the optical pickup inspection device 3. Hereinbelow, the operation of defocus-offset-amount optimum value calculation process is explained in detail according to FIGS. 1 and 2.

Referring to FIG. 2, at step S1, a command for changing the defocus offset amount in constant steps in both positive and negative directions of focus is issued to the actuator drive circuit 16, by which the defocus offset amounts are set. In this case, the individual defocus offset amounts are set within such a range that the jitter is worsened by a specified percentage (about 1% to 2%) from the predicted bottom value so as not to cause departure from the servo control operation.

At step S2, based on reproduction signals inputted, for every defocus offset amounts set in the step S1, from the reproduction signal generation circuit 14 of the optical pickup device 1, every jitter values of the reproduction signals are calculated. Then, the defocus offset amounts set in the step S1 and the jitter values calculated in this step S2 are stored, as they are associated with each other, into the memory 18.

At step S3, based on all the sets of defocus offset amount and jitter value stored in the memory 18, a quadric approximating curve resulting from plotting jitter values versus the defocus offset amounts, respectively, is determined. At step S4, a correlation coefficient $R^2$ between measured values and approximate values in the quadric approximating curve of defocus offset amounts and jitter values is calculated.

Figure 3:
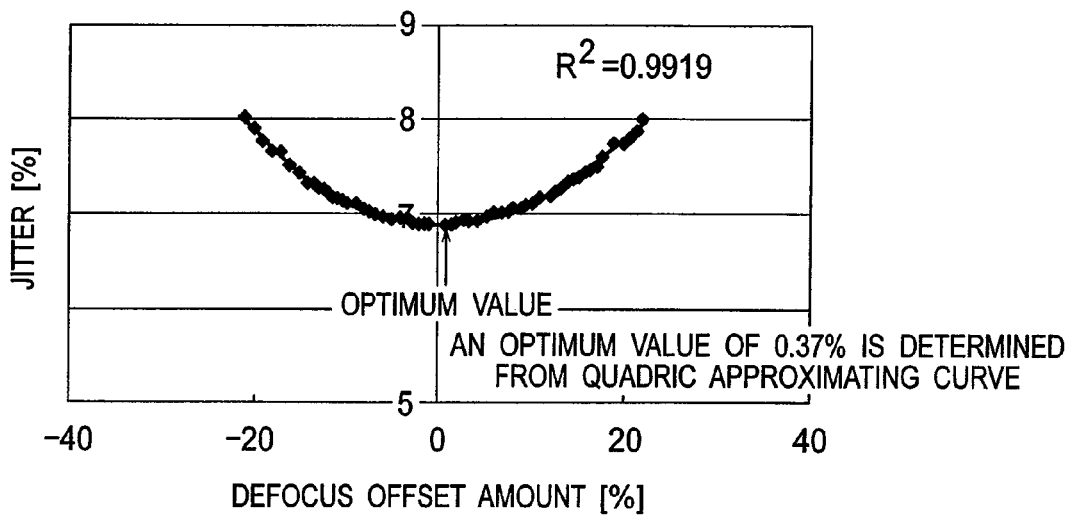
FIG. 3 is a chart showing measured values of jitter as well as their quadric approximating curve versus defocus offset amounts.

Assume that measured values of jitter versus the individual defocus offset amounts, as well as a quadric approximating curve of the measured values of jitter, are obtained as shown in FIG. 3. In this case, a distribution graph is drawn by plotting each point, x coordinate of which is measured value of jitter and y coordinate of which is a value of jitter in the quadric approximating curve corresponding respectively to each of the defocus offset amounts, and by determining a correlation coefficient of this distribution, an approximate value of $R^2=9.9919$ is obtained. It is noted that the optimum value of the defocus offset amount in this case is 3.37%.

Figure 4:
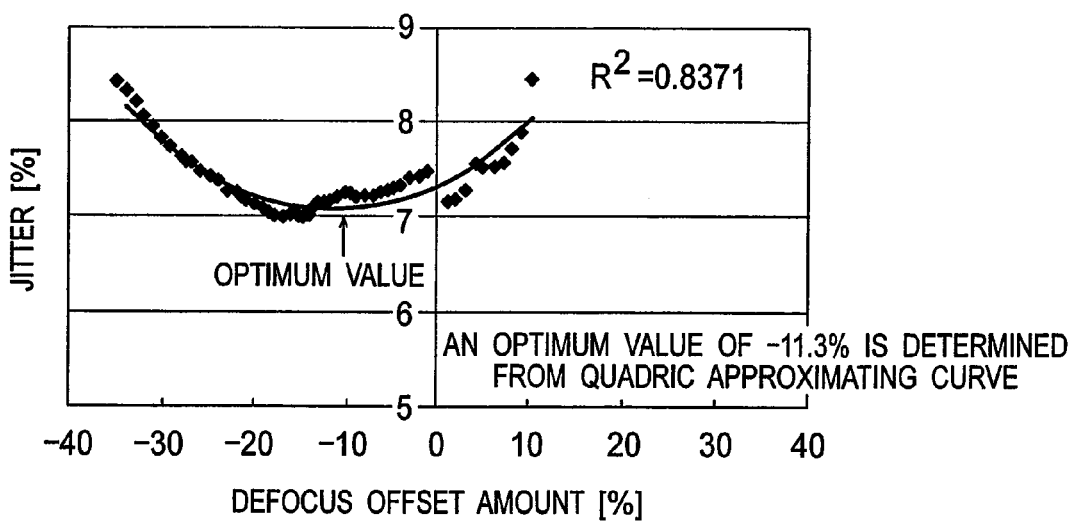
FIG. 4 is a chart showing measured values of jitter as well as their quadric approximating curve other than those of FIG. 3.

On the other hand, in the case of an optical pickup device whose jitter is unstable due to errors of assembling adjustment or the like, measured values of jitter versus the defocus offset amounts become discontinuous as shown in FIG. 4. Then, by determining a quadric approximating curve of such varied jitter values, and by determining a correlation coefficient from this quadric approximating curve, a correlation coefficient of $R^2=0.8371$ is obtained. In this case, the optimum value of the defocus offset amount is −11.3%, showing occurrence of an error in the measurement result of the optimum value, as compared with such a variation-free measurement result as shown in FIG. 3.

As shown above, errors of the optimum value of the defocus offset amount due to instabilities of the optical pickup device or other various factors appear in the correlation coefficient $R^2$. Therefore, with a threshold (in this embodiment, threshold=0.9) defined for the value of the correlation coefficient $R^2$, it is decided at step S5 whether or not the value of the correlation coefficient $R^2$ determined in the step S4 is equal to or lower than the threshold value. As a result, if the correlation coefficient $R^2$ is equal to or lower than the threshold value, then it is decided that the measurement result of jitter values has variations, followed by return to the step S1, where the setting of defocus offset amounts and the calculation of jitter values of the reproduction signals are executed once again. On the other hand, if the correlation coefficient $R^2$ is over the threshold value, then the program goes to step S6.

At step S6, a defocus offset amount corresponding to a bottom value of jitter in the quadric approximating curve determined in the step S3 is determined as an optimum value of the defocus offset amount. At step S7, the optimum value (servo parameter) of the defocus offset amount determined in the step S6 is recorded in a data recording section 19 provided in the optical pickup device 1. Finally, the value data is utilized as control data for the optical information recording/reproduction apparatus on which the optical pickup device 1 is mounted. After that, the operation of defocus-offset-amount optimum value calculation process is ended.

Figure 5:
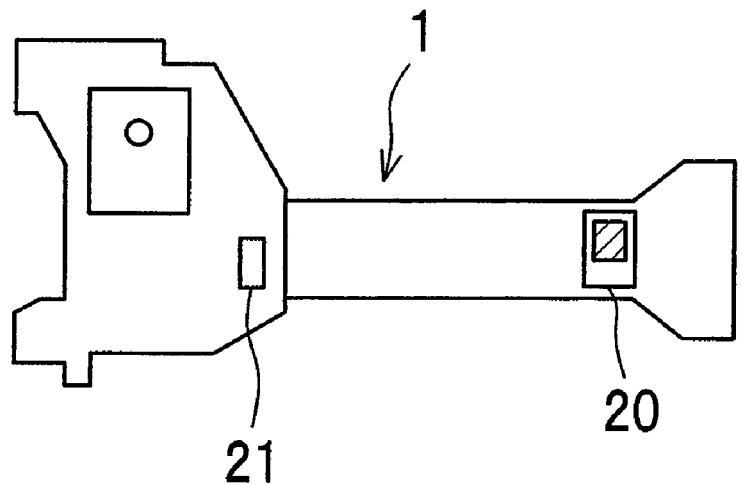
FIG. 5 is an explanatory view of QR code data and a semiconductor memory provided in the optical pickup device.

As an example of the data recording section 19 in the optical pickup device 1 in which an optimum value (servo parameter) of the defocus offset amount determined as described above, there can be mentioned a recording medium in which QR code (Quick Response code) has been recorded. In this case, the determined optimum value (servo parameter) of the defocus offset amount is converted into a QR code by a code converter (not shown). Then, the recording medium in which the converted QR code data 20 has been recorded is attached to the optical pickup device 1 as shown in FIG. 5, and shipped as such. In assembly into the optical information recording/reproduction apparatus, the optimum value (servo parameter) of the defocus offset amount recorded in the QR code data 20 is read by a separate code reader (not shown). Then, the read value is stored into a storage unit or the like of the optical information recording apparatus, thus allowing the value data to be utilized as control data for the optical pickup device 1.

Also, as another example of the data recording section 19 of the optical pickup device 1, there can be used a semiconductor memory 21 mounted on the optical pickup device 1 such as shown in FIG. 5. The semiconductor memory 21 has electrical interconnections (not shown) for electrically performing write and read of recorded data from outside the optical pickup device 1. Then, by the microprocessor 15 of the optical pickup inspection device 3, the optimum value (servo parameter) of the defocus offset amount is written into the semiconductor memory 21 via the electrical interconnections. When the optical pickup device 1 is incorporated into the optical information recording/reproduction apparatus, the optimum value (servo parameter) of the defocus offset amount written in the semiconductor memory 21 is read via the optical information recording/reproduction apparatus so as to be utilized as control data for the optical pickup device 1.

Next, the calculation of a quadric approximating curve to be executed in the step S3 in the operation of defocus-offset-amount optimum value calculation process shown in FIG. 2, as well as the method for calculation of the correlation coefficient $R^2$ to be executed in the step S4, are concretely described below.

Jitter measured values for the individual defocus offset amounts set in the step S1 obtained from the reproduction signals are approximated with the quadric curve shown in Equation (1) below by the least squares method:

$$y = ax^2 + bx + c \quad (1)$$

In this approximation, a, b, c are determined so that E shown in Equation (2) becomes a minimum $$E = \sum_{i=1}^{n} (y_i - ax_i^2 - bx_i - c)^2 \quad (2)$$

where i is the number of a set of the set defocus offset amounts and jitter values obtained from the reproduction signals in association with the defocus offset amounts, respectively, and n is the number of those sets.

A correlation coefficient between the quadric approximating curve obtained in this way and measured values is determined by Equation (3):

$$R^2 = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}} \quad (3)$$

where the bar-added y is an average value of the defocus offset amounts. Also, the bar-added x is an average value of the jitter values.

Calculations of Equations (1), (2) and (3) shown above are executed by the microprocessor 15 of the optical pickup inspection device 3.

As described above, in this embodiment, the optical pickup inspection device 3 issues a command to the actuator drive circuit 16 for changing the defocus offset amount in constant steps toward both positive and negative directions of focus to set the defocus offset amounts for the optical pickup device 1, the optical pickup inspection device 3 calculates jitter values of reproduction signals for the set defocus offset amounts inputted from the reproduction signal generation circuit 14 of the optical pickup device 1. Then, based on every set of defocus offset amount and jitter value, a quadric approximating curve is determined by plotting the jitter values versus the individual defocus offset amounts, and a correlation coefficient $R^2$ between measured values and approximate values regarding the defocus offset amounts and the jitter values is calculated.

Then, in the case where the value of the correlation coefficient $R^2$ is equal to or lower than the threshold value, this means that the measurement result of jitter values has variations, thus the setting of defocus offset amounts and the calculation of jitter values of the individual reproduction signals are executed once again. On the other hand, if the value of the correlation coefficient $R^2$ is over the threshold value, a defocus offset amount corresponding to a bottom value of jitter in the quadric approximating curve is determined as an optimum value of defocus offset amount. Therefore, a less-error optimum value of the defocus offset amount can be obtained stably.

The foregoing embodiment has been described on a case where an optimum value of defocus offset amount is detected as a servo parameter. However, without being limited to this, the invention may be applied to cases where an optimum value of inclination angle of the optical pickup device 1, or an optimum position of the collimator lens in the process of spherical aberration correction by the collimator lens drive method, is detected as the servo parameter.

In this case, particularly with an optical pickup device that involves correction of spherical aberration such as in BDs, if the operating range for the collimator lens to be operated in the optical-axis direction is limited due to configurational constraints attributed to reduction of size or thickness of the devices, there are some cases where the position of the collimator lens cannot be set within such a range that the jitter value of the reproduction signal is worsened by about 1% to 2% from a predicted bottom value by varying the position of the collimator lens in the optical-axis direction.

Figure 6:
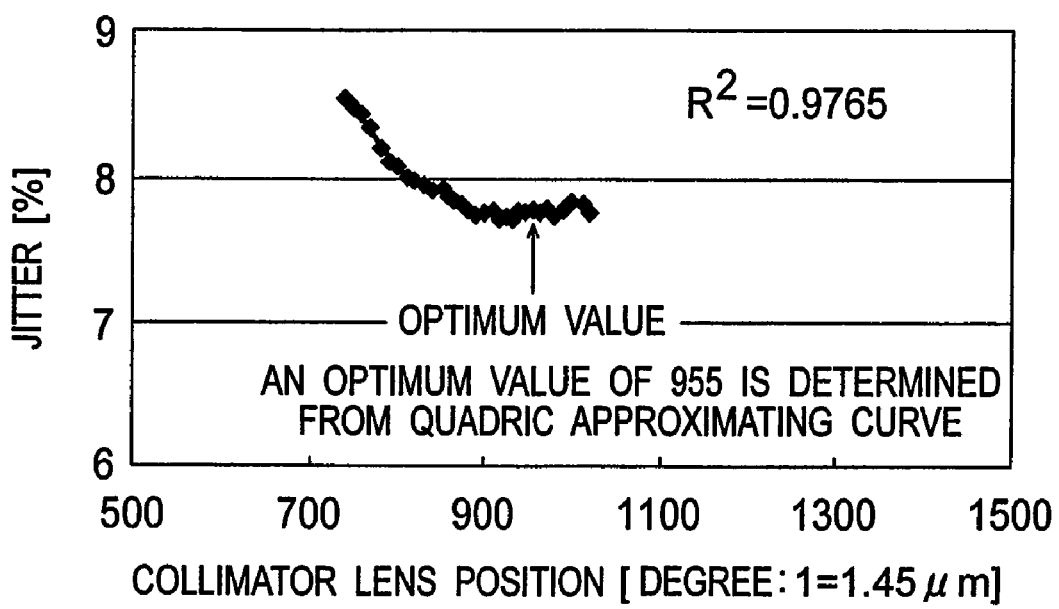
FIG. 6 is a chart showing a jitter distribution versus position of the collimator lens in the optical-axis direction, stroke of which is not sufficient.

With an optical pickup device that cannot obtain enough stroke of the collimator lens, jitter relative to the position of the collimator lens in the optical-axis direction becomes as shown in FIG. 6. In this case, the position of the collimator lens cannot be varied until the jitter is worsened by 1% from the predicted bottom value. Therefore, it is no longer possible to apply a detection method that the optimum position of the collimator lens is given by a midpoint of a line segment interconnecting two points where the jitter is worsened by 1% from the bottom value, as would be applied conventionally.

However, by utilizing a quadric approximating curve as in this embodiment, it become implementable to presume an optimum position of the collimator lens from individual measured values of jitter resulting when the jitter is partially obtained on only one side of the bottom value.

Further, although not described in this embodiment, it is needless to say that a tracking error signal generation circuit and a focus error signal generation circuit are provided in the optical pickup device 1.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A servo parameter detection method comprising the steps of:
    outputting a command for changing a servo parameter from an optical pickup inspection device to an optical pickup device which performs recording and reproduction on an optical recording/reproduction medium by using laser light so that the servo parameter of the optical pickup device is changed successively;
    generating reproduction signals successively by a reproduction signal generation circuit of the optical pickup device, based on reflected light resulting when the laser light emitted from the optical pickup device by successively changing the servo parameter is reflected by a reference disc serving as a reference for adjustment of the servo parameter;
    based on the reproduction signal generated by the reproduction signal generation circuit for each of the servo parameters, determining jitter representing quality of the reproduction signal by the optical pickup inspection device;
    by the optical pickup inspection device, approximating a relationship between the servo parameters and the jitter values, respectively, with an approximating curve;
    by the optical pickup inspection device, calculating a correlation coefficient between approximate values in the approximating curve of the servo parameters and the jitter values and measured values; and
    by the optical pickup inspection device, on condition that the calculated correlation coefficient is equal to or lower than a specified value, outputting once again to the optical pickup device a command for changing the servo parameter and calculating a correlation coefficient between the approximate values and the measured values of the servo parameters and the jitter values, and on the other hand, on condition that the calculated correlation coefficient is over the specified value, detecting a servo parameter value corresponding to a best value of the jitter values as a servo parameter of the optical pickup device.

2. The servo parameter detection method as claimed in claim 1, wherein
    the servo parameter of the optical pickup device is a spherical aberration correction amount.

3. The servo parameter detection method as claimed in claim 1, wherein
    the servo parameter of the optical pickup device is an inclination angle of a pickup.

4. The servo parameter detection method as claimed in claim 1, wherein
    the servo parameter of the optical pickup device is a defocus offset amount.

5. The servo parameter detection method as claimed in claim 2, wherein
    in a step of successively shifting a collimator lens in an optical-axis direction by the optical pickup device in response to a command derived from the optical pickup inspection device to thereby successively change the spherical aberration correction, if enough range of jitter values to obtain the jitter best value cannot be obtained due to a limited operating range of the collimator lens in the optical-axis direction, the jitter best value is obtained by using the approximating curve.

* * * * *